March 2, 1954 A. L. PIPPER ET AL 2,670,645

DEVICE FOR TRIMMING THE EDGE OF PHONOGRAPH RECORDS

Filed July 25, 1950 3 Sheets-Sheet 1

Inventors,
Arnold L. Pipper
Walter H. Stemskorn
by their Attorneys,
Darby + Darby March 2, 1954 A. L. PIPPER ET AL 2,670,645

DEVICE FOR TRIMMING THE EDGE OF PHONOGRAPH RECORDS

Filed July 25, 1950 3 Sheets-Sheet 2

Inventors,
Arnold L. Pipper
Walter H. Sternshorn
by their Attorneys,
Darby & Darby

DEVICE FOR TRIMMING THE EDGE OF PHONOGRAPH RECORDS

Filed July 25, 1950 3 Sheets-Sheet 3

Inventors,
Arnold L. Pipper
Walter H. Sternshorn
by their Attorneys,
Darby & Darby Patented Mar. 2, 1954 2,670,645

UNITED STATES PATENT OFFICE 2,670,645

DEVICE FOR TRIMMING THE EDGE OF PHONOGRAPH RECORDS

Arnold L. Pipper, Orange, and Walter U. Stemshorn, Westwood, N. J., assignors to Loew's Incorporated, New York, N. Y., a corporation of Delaware Application July 25, 1950, Serial No. 175,686

4 Claims. (Cl. 82—1.1)

The present invention relates to devices for trimming the edges of phonograph records and particularly to such devices for removing the flash from phonograph records made of a Vinylite or like plastic material. In the past it has been customary in finishing the edges of the older type phonograph records made of shellac composition to grind the flash from the record. This operation was frequently performed on a group of records which were rotated while in contact with an abrasive wheel. Records of Vinylite and like plastics are normally much thinner than the older type shellac records and furthermore are not readily ground, the flash being frequently so thin that it breaks off leaving jagged edges.

Our present invention comprises a heated knife which strips the flash from the record and leaves a smooth edge. The device is so constructed that it may readily be used as an attachment to the press in which the records are molded, thereby making it possible for the operator to finish the record and eliminate the step of grouping the records into stacks and performing a grinding operation separately from the molding operation.

It is an object of our invention to provide a device for removing the molding flash from phonograph records which device utilizes a heated knife blade to cut and burn the flash from the record edge and at the same time to smooth the record edge.

It is another object of our invention to provide a record edging device so organized that a record may be placed upon the turntable thereof and subsequently lowered to such a position that a heated knife blade penetrates the record and thereafter removes the flash from the entire circumference of the record, the record being continuously rotated during the flash-removing operation.

It is another object of our invention to provide a record edging device of the type described, the operation of which may be coordinated with the operation of a pressure molding machine in order that a single operator may readily operate both the molding press and the edging device.

It is a further object of our invention to provide a record edging device having a knife blade which is electrically heated whereby the temperature thereof may be readily controlled.

Other objects and features of the invention will appear when the following description is considered in connection with the annexed drawings in which.

Figure 1:
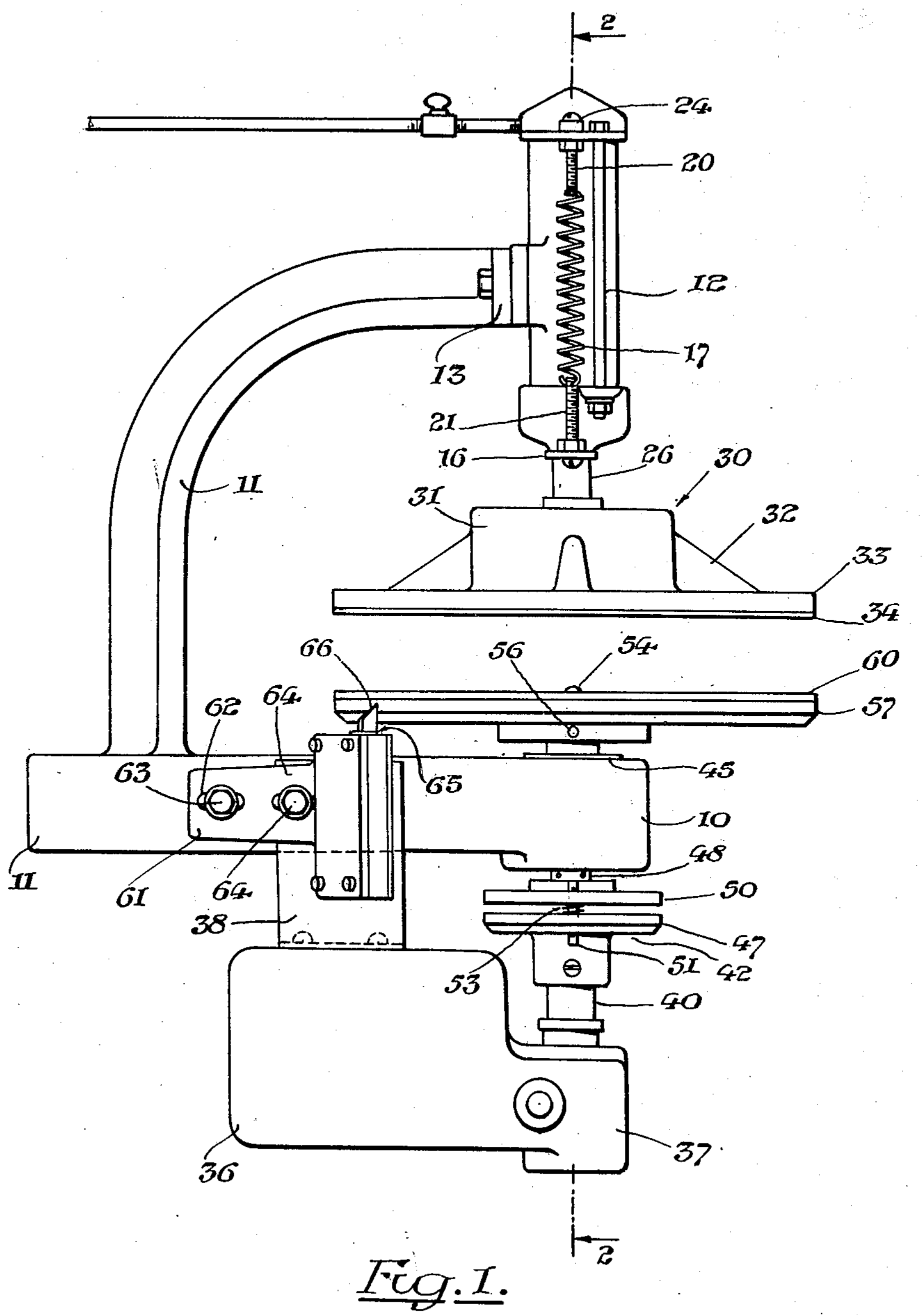
Figure 1 is a side elevational view of the record edging device of our invention.

Referring now to the drawings, there is shown at 10 a base which may be supported in any suitable manner, but would ordinarily be supported by brackets fixed to the press on which phonograph records are to be stamped or molded. Extending upwardly from the base 10 is an arm 11 which in turn serves to support a fluid pressure cylinder 12. The cylinder 12 is of conventional type and is supported at the upper end of the bracket or arm 11 by means of the bolts 13. The cylinder 12 is provided with the usual piston 14 and piston rod 15, the rod 15 having pinned thereto at its lower end exterior to the cylinder 12 a cross-bar 16. The cross-bar 16 is spring-urged upwardly by the two springs 17 and 18 which extend between the screws 20—21 and 22—23 respectively. As is clearly shown in the drawing, the screws 20 and 22 are adjustably fixed in small brackets 24 and 25 fastened to the cylinder 12 while the screws 21, 23 are adjustably fixed in the ends of the crossbar 16.

Fixed to the lower end of the piston rod 15 is a sleeve 26 on which is mounted a suitable bearing 27, the bearing being held in place by means of the nut 28. The outer race of the bearing 27, which is preferably a ball bearing, is press-fitted into a bore in an operating head 30 whereby the head 30 is reciprocable vertically with the piston and piston rod and is rotatable with respect thereto. The head 30 comprises a central hub portion 31, a plurality of spokes 32, and a rim portion 33, a friction material such as rubber being fixed to the rim 33 as shown at 34. The hub portion 31 of the head 30 is provided with a bore 35 in its lower surface for a purpose which will hereinafter be described.

Figures 2, 3:
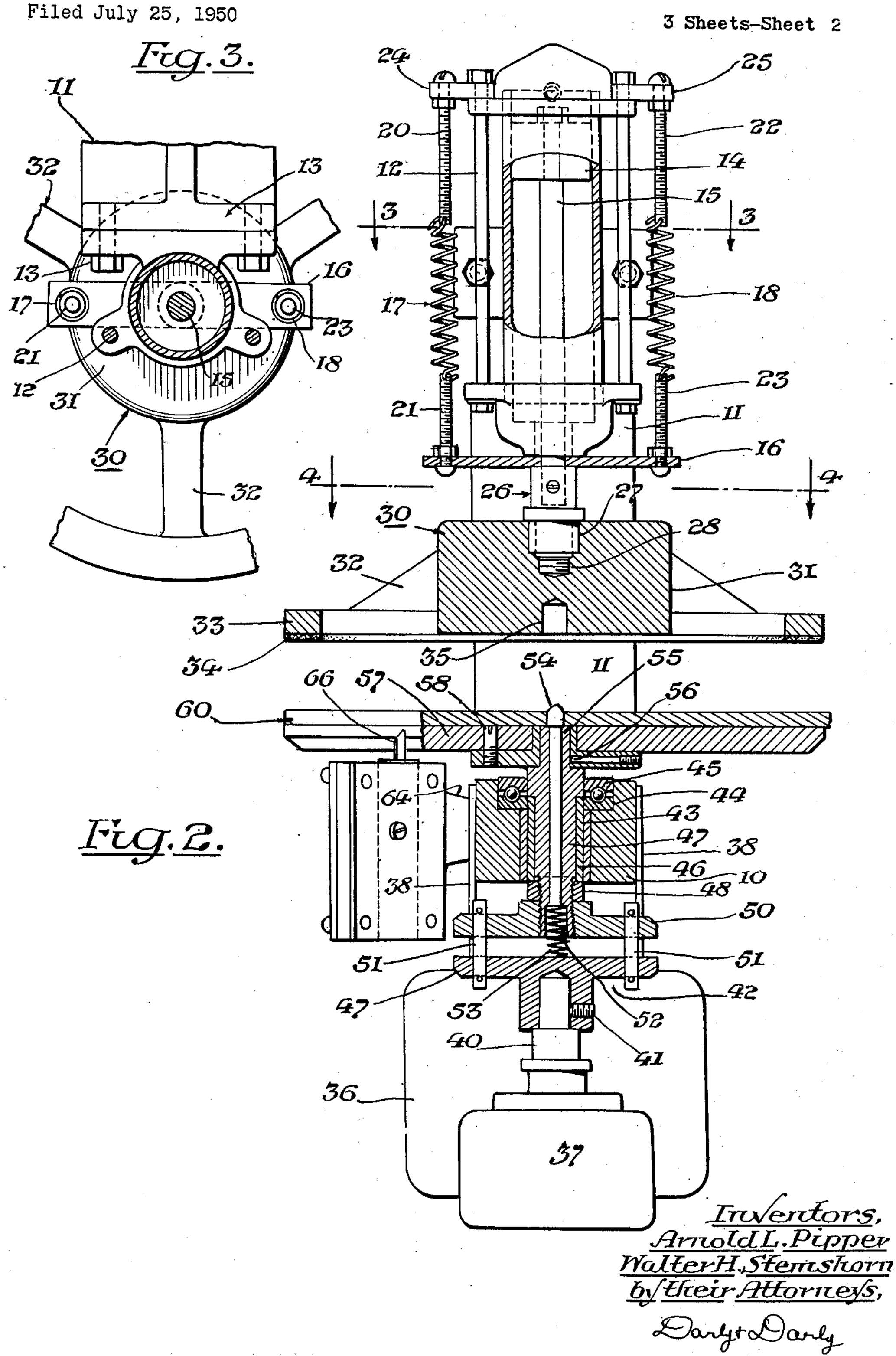
Figure 2 is a vertical cross-section of the record edging device of Figure 1, the section being taken along the line 2—2 of Figure 1.
Figure 3 is a transverse cross-sectional view of the pneumatic or hydraulic cylinder which serves to raise and lower the record-holding device. This view is taken on the plane of line 3—3 of Figure 2.

A motor and worm gear drive (not shown) lie within a housing comprising portions 36 and 37, Figures 1 and 2, which housing is supported on a U-shaped bracket 38 fixed to and dependent from the base member 10. The motor driven shaft 40 extends upwardly and has fixed thereto, by any suitable means such as the setscrew 41, a drive coupling 42.

The outer end of the base member 10 is provided with a bore 43 which bore has a central portion, an upper portion of enlarged diameter, and lower portion of reduced diameter. Mounted in the upper large portion 44 of the bore 43 is a thrust bearing 45. In the central portion of the bore 43 there is mounted a needle bearing 46 the inner race of which is held in position on shaft 47 by means of the nut 48. At its lower end shaft 47 is threaded and has fixed thereto the driven coupling member 50 which cooperates with the driving member 42 previously described. These two members are coupled for rotation together by means of the drive pins 51 which pins extend through holes in the coupling members or plates 42 and 50.

The lower end of the shaft 47 is provided with a counterbore 52 in which a spring 53 is seated, the lower end of said spring being in contact with the upper surface of the coupling 42, the spring thereby tending to separate the two plates and to raise the shaft 47 into an upper position.

The shaft 47 is provided with a small bore throughout its length and a spindle 54 is fixed in the upper end of the bore, this spindle serving as a means for locating a phonograph record on a turntable supported in the manner about to be described.

Fixed to the upper reduced end 55 of the shaft 47 is a flanged sleeve 56 on which is supported a turntable 57, the turntable being fixed to the flange of sleeve 56 by any suitable means such, for example, as the screws 58. The turntable 57 is provided with a felt or other friction surface 60, so that a record placed thereon may readily be caused to rotate with the table.

Figure 4:
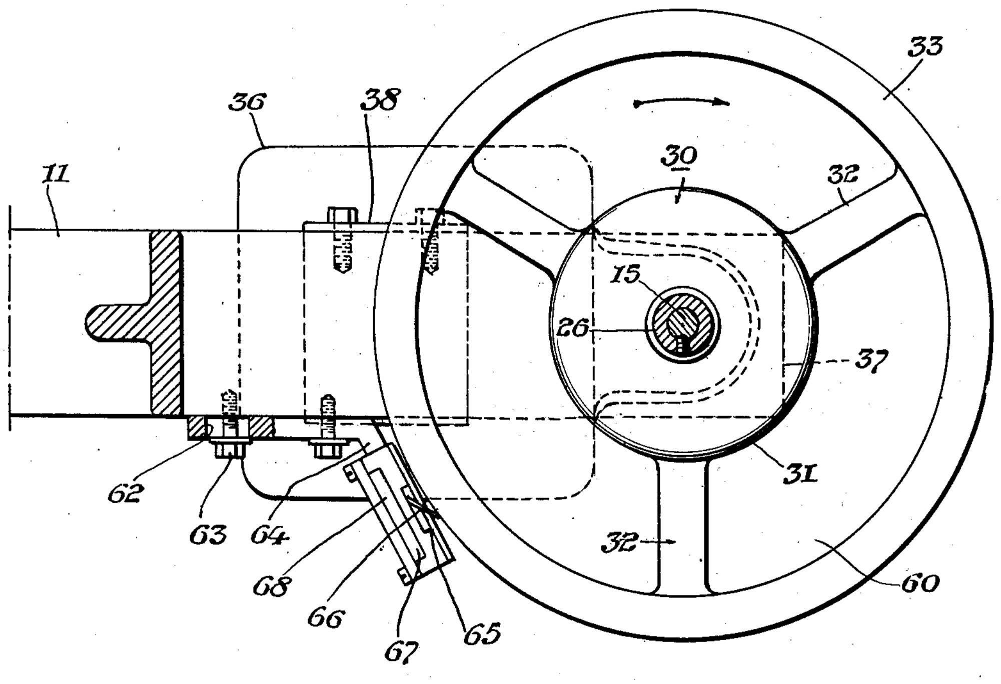
Figure 4 is a transverse cross-sectional view of the record edging device, the view being taken on the plane of line 4—4 of Figure 2.

Adjustably fastened to one side of the base 10 is a bracket 61 which, at its right hand end, as seen in Figures 1 and 4, has a bent-over portion which extends substantially tangential to the turntable 57 and the rim 33 of the head 30. The bracket 61 is, as stated, adjustably mounted, the adjustment being provided by means of the slotted openings 62 in the bracket through which extend the fastening screws 63 so that the bracket may be moved longitudinally of the base member 10. The bent-over end 64 of the bracket 61 is provided with grooves on its inner and outer faces. Mounted in the groove 65 in the inner face of the portion 64 of bracket 61 is a knife 66 which extends upwardly and lies adjacent the edge of the turntable 57, and being normally immediately below the edge of a record placed on the turntable 57.

Figure 5:
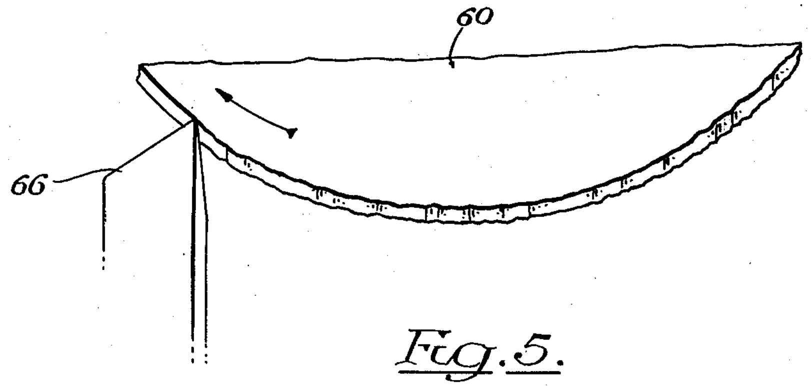
Figure 5 is a fragmentary perspective view of a record showing the position of the knife with respect thereto during the edging operation.

Mounted in the groove 67 in the side of the portion 64 on bracket 61 opposite the groove 65 is an electric heating element 68. As will readily be seen this element transfers its heat through the thin wall portion of the bracket 64 to the knife 66 to heat that knife to a desired temperature. As is clearly seen in Figure 5, the knife 66 terminates in a point at its upper end and is sharpened along its leading or right hand edge.

The above sets forth the structural features of the device, the operation of which will now be described.

When a record is taken from a molding press it has mold flash thereon along its circumference. The record is placed on the turntable 57 with the central hole in the record on the spindle 54. The record immediately starts to revolve since the motor 36 is continuously operated. The rotation of the record at this time is, however, without effect since the record is above the plane in which the point of the knife 66 is situated. However, upon actuation of the hydraulic or pneumatic piston 14 the head 30 is lowered forcing the turntable downwardly against the urge of the spring 53. As the record descends the heated knife 66 penetrates through the flash extending about the circumference of the record and thereafter the continued rotation of the record causes the flash to be trimmed therefrom and the circumferential edge to be smoothed and made true and straight. Preferably the operation of the hydraulic or pneumatic piston 15 is initiated by the actuation of the fluid pressure operated mechanism of the record pressing machine so that a single operator having placed molding material in the press may at the same time initiate operation of the press to form a new record and operation of the edging device to edge the record just removed from the press.

Also it is preferable that the fluid in the cylinder 12 be exhausted after the record has completed one or a few revolutions and this may be accomplished in any suitable manner such for example as by means of a timing device operated either by the motor or by a separate clock work, the operation of which is initiated by the same mechanism which controls the admission of pressure fluid to the cylinder 12. By either of these methods the head 30 will descend, will be held in its lower position for a predetermined time, and will then be released and will rise under urge of the springs 17 and 18 transmitted to the piston rod through the crossbar 16.

While we have described a preferred embodiment of our invention, it will be understood that many modifications thereof are possible. We wish therefore to be limited not by the foregoing description, but on the contrary, solely by the claims granted to us.

What is claimed is:

1. In a device for the removal of mold flash from the edge of plastic disk phonograph records, the combination of a continuously revolvable shaft, power means for rotating said shaft, a turntable mounted on said shaft, said turntable being adapted to receive the phonograph record with the record periphery extending beyond the turntable, means mounting said shaft for vertical reciprocating movement, a rotatable plate mounted above and in substantially axial alignment with said turntable, a heated knife mounted adjacent the edge of said turntable and below the normal plane thereof, and means for lowering said plate to press a record placed on said turntable downwardly together with said turntable and said shaft to thereby cause said knife to penetrate through the mold flash on the record edge and trim the flash from the record as the turntable revolves.

2. In a device for the removal of mold flash from the edge of plastic disk phonograph records, the combination of a continuously revolvable shaft, power means for rotating said shaft, a turntable mounted on said shaft, said turntable being adapted to receive the phonograph record with the record periphery extending beyond the turntable, means mounting said shaft for vertical reciprocating movement, a rotatable plate mounted above and in substantially axial alignment with said turntable, a heated knife mounted adjacent the edge of said turntable and below the normal plane thereof, and pressure fluid operated means for lowering said plate to press a record placed on said turntable downwardly together with said turntable and said shaft to thereby cause said knife to penetrate through the mold flash on the record edge and trim the flash from the record as the turntable revolves.

3. In a device for the removal of mold flash from the edge of plastic disk phonograph records, the combination of a continuously revolvable shaft, power means for rotating said shaft, a turntable mounted on said shaft, said turntable being adapted to receive the phonograph record with the record periphery extending beyond the turntable, means mounting said shaft for vertical reciprocating movement, means normally urging said shaft to its upward position, a rotatable plate mounted above and in substantial axial alignment with said turntable, a heated knife mounted adjacent the edge of said turntable and below the normal plane thereof, and pressure fluid operated means for lowering said plate to press a record placed on said turntable downwardly together with said turntable and said shaft to thereby cause said knife to penetrate through the mold flash on the record edge and trim the flash from the record as the turntable revolves.

4. In a device for the removal of mold flash from the edge of plastic disk phonograph records in combination, a motor, a drive plate rotated by said motor, a driven plate coupled to said drive plate and rotated thereby, a vertically mounted shaft fixed to said driven plate, said shaft and driven plate being vertically reciprocable with respect to said driving plate, a turntable mounted on said shaft, means mounting said shaft for vertical reciprocating movement, means normally urging said shaft to its upward position, a rotatable plate mounted above and in substantially axial alignment with said turntable, a knife adjustably mounted adjacent the edge of said turntable and below the normal plane thereof, electrical means for imparting heat to said knife, and means for lowering said plate to press a record placed on said turntable downwardly together with said turntable and said shaft to thereby cause said knife to penetrate through the mold flash on the record edge and trim the flash from the record as the turntable revolves.

ARNOLD L. PIPPER.
WALTER U. STEMSHORN.

References Cited in the file of this patent

UNITED STATES PATENTS

| Number | Name | Date |
|---|---|---|
| 382,414 | Edison | May 8, 1888 |
| 393,464 | Edison | Nov. 27, 1888 |
| 1,505,833 | Wells | Aug. 19, 1924 |
| 1,610,094 | Hodgins | Dec. 7, 1926 |
| 1,885,848 | March | Nov. 1, 1932 |
| 2,410,443 | Hoffer | Nov. 5, 1946 |
| 2,441,322 | Jager | May 11, 1948 |
| 2,448,030 | Hinckley | Aug. 31, 1948 |
| 2,448,751 | Volkel | Sept. 7, 1948 |
| 2,586,663 | Keck | Feb. 19, 1952 |